United States Patent
Jung et al.

(10) Patent No.: US 10,482,267 B2
(45) Date of Patent: Nov. 19, 2019

(54) LINUX BASED ANDROID CONTAINER PLATFORM, DEVICE EQUIPPED WITH THE SAME AND METHOD FOR APPLY SECURITY SYSTEM IN LINUX BASED ANDROID CONTAINER ENVIRONMENT

(71) Applicant: Foundation of Soongsil University-Industry Cooperation, Seoul (KR)

(72) Inventors: Souhwan Jung, Seoul (KR); Jaehyeon Yoon, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 186 days.

(21) Appl. No.: 15/835,082

(22) Filed: Dec. 7, 2017

(65) Prior Publication Data

US 2019/0102566 A1    Apr. 4, 2019

(30) Foreign Application Priority Data

Sep. 29, 2017   (KR) .................. 10-2017-0128066

(51) Int. Cl.
| | | |
|---|---|---|
| *G06F 21/60* | (2013.01) | |
| *G06F 9/48* | (2006.01) | |
| *G06F 9/54* | (2006.01) | |
| *G06F 16/18* | (2019.01) | |

(52) U.S. Cl.
CPC .......... *G06F 21/604* (2013.01); *G06F 9/4843* (2013.01); *G06F 9/545* (2013.01); *G06F 16/18* (2019.01); *G06F 2221/2141* (2013.01)

(58) Field of Classification Search
CPC ........ G06F 21/604; G06F 16/18; G06F 9/545; G06F 9/4843; G06F 2221/2141
See application file for complete search history.

(56) References Cited

U.S. PATENT DOCUMENTS

| | | | |
|---|---|---|---|
| 10,181,028 B2* | 1/2019 | Xu .......................... | G06F 21/53 |
| 2014/0137183 A1* | 5/2014 | Russello ................. | G06F 21/60 |
| | | | 726/1 |
| 2014/0137184 A1* | 5/2014 | Russello ................. | G06F 21/60 |
| | | | 726/1 |

(Continued)

OTHER PUBLICATIONS

Shabtai et al.; "Securing Android-Powered Mobile Devices Using SELinux", 2010, IEEE, pp. 36-44. (Year: 2010).*

(Continued)

*Primary Examiner* — Matthew Smithers
(74) *Attorney, Agent, or Firm* — Novick, Kim & Lee, PLLC; Sang Ho Lee

(57) ABSTRACT

A system for running a Linux based Android container platform with a processor and a memory is disclosed. The system includes a Linux host, an Android container which runs on the Linux host, and an integrated security module including a Linux security module having a Linux policy of a process running on the Linux host, and an Android security module having an Android policy of a process running on the Android container. The integrated security module is mounted in a directory shared between the Linux host and the Android container and the integrated security module overwrites a pre-existing Linux security module.

15 Claims, 3 Drawing Sheets

(56) References Cited

U.S. PATENT DOCUMENTS

| | | | | |
|---|---|---|---|---|
| 2014/0181974 | A1* | 6/2014 | Yablokov | G06F 21/566 |
| | | | | 726/23 |
| 2015/0347748 | A1* | 12/2015 | Krstic | G06F 21/53 |
| | | | | 726/1 |
| 2016/0196432 | A1* | 7/2016 | Main | G06F 8/61 |
| | | | | 726/1 |
| 2016/0205082 | A1* | 7/2016 | Puderer | G06F 8/61 |
| | | | | 713/165 |
| 2016/0342804 | A1* | 11/2016 | Reddy | G06F 21/6218 |
| 2018/0137308 | A1* | 5/2018 | Jung | G06F 21/53 |
| 2018/0204001 | A1* | 7/2018 | Jung | G06F 21/566 |
| 2018/0268156 | A1* | 9/2018 | Luo | G06F 21/53 |

OTHER PUBLICATIONS

Russello et al.; "MOSES: Supporting Operation Modes on Smartphones", Jun. 2012, ACM, pp. 3-12. (Year: 2012).*

Sungmin Lim, "A Study on Design and Implementation of SELinux Security Function for ARM-Based Android Container". Dissertation, Dec. 2016., pp. 1-22, Graduate School of Soongsil University Department of Information and Telecommunication Engineering, Seoul, Republic of Korea.

Seong-Hwa Jeong and Tae-Jung Lho, "A Study on Implementation of Android Security System Based on SELinux". Journal, May 14, 2010, vol. 11, No. 8, pp. 3005-2011. Tongmyong University Department of Mechatronics Engineering, Journal of the Korea Academia-Industrial Cooperation Society.

Song Wu et al, "Container-Based Cloud Platform for Mobile Computation Offloading", 2017 IEEE International Parallel and Distributed Processing Symposium, pp. 123-132 (Jul. 2017).

Richard Haines, "The SELinux Notebook, 4th Edition" (2014).

* cited by examiner

LINUX BASED ANDROID CONTAINER PLATFORM, DEVICE EQUIPPED WITH THE SAME AND METHOD FOR APPLY SECURITY SYSTEM IN LINUX BASED ANDROID CONTAINER ENVIRONMENT

CROSS-REFERENCE TO RELATED APPLICATIONS

This application claims priority under 35 U.S.C. § 119 to Korean Patent Application No. 10-2017-0128066, filed on Sep. 29, 2017, in the Korean Intellectual Property Office, the disclosure of which is incorporated herein by reference in its entirety.

TECHNICAL FIELD

The present disclosure relates to a Linux based Android container platform, a device equipped with the same and a method for applying a security system in a Linux based Android container environment, and more particularly, to a platform in which an Android container runs on a Linux based operating system, a device equipped with the same and a method for applying a security system when an Android container runs on a Linux based operating system.

BACKGROUND

Android is a mobile operating system (OS) developed based on Linux. Thus, part of Linux kernel has an option for Android.

Container technology is a technology used to provide an isolated virtual space of operating system level using namespace and control groups (cgroups). According to container technology, because it does not support device or kernel virtualization, it shares the kernel and device with Linux. That is, the container and Linux shares the process directory/proc having various process information and the system directory/sys including system and device information. Then, the container can operate two systems by isolating the virtualized space using the namespace and restricting resources such as cpu or memory using the cgroups. Using this container technology, it is possible to run the Android container on the Linux operating system.

Meanwhile, Security-Enhanced Linux (SELinux) is a type of Linux Security Module (LSM) provided by Linux operating system, and the SELinux file system is placed on /sys/fs/selinux of Linux and operates according to a policy placed on the corresponding folder in an operating system booting process.

Furthermore, Security Enhancements for Android (SEAndroid) is made to apply to an Android framework based on SELinux, and operates in the same way as SELinux.

Accordingly, when the Android container runs on the Linux operating system, the Android container mounts the SEAndroid file system in the system directory/sys shared with Linux, causing a conflict problem of the SEAndroid file system overwriting the SELinux file system. In this case, the SELinux file system is erased, and normal operation of Linux operating system processes becomes difficult.

SUMMARY

An aspect of the present disclosure provides a Linux based Android container platform to which an integrated security module including both file systems for security of Linux and Android processes is applied.

Another aspect of the present disclosure provides a device equipped with a Linux based Android container platform to which an integrated security module including both file systems for security of Linux and Android processes is applied.

According one embodiment of the present disclosure, a system for running a Linux based Android container platform with a processor and a memory is provided. The system includes a Linux host, an Android container which runs on the Linux host, and an integrated security module including a Linux security module having a Linux policy of a process running on the Linux host, and an Android security module having an Android policy of a process running on the Android container. The integrated security module is mounted in a directory shared between the Linux host and the Android container and the integrated security module overwrites a pre-existing Linux security module.

The Android container shares kernel and device with the Linux host.

The Android container mounts process (proc) and system (sys) directory of the Linux host in a Root File System of the Android container.

The integrated security module overwrites the pre-existing Linux security module, when the Android container runs on the Linux host.

The integrated security module assigns context to a file, user, and process.

The integrated security module includes a policy that specifies rules between the contexts.

The integrated security module performs system access control according to the policy that specifies rules between the contexts.

The integrated security module includes the Linux security module and a lightweight Android security module which allows the Linux security module to be applied to an Android framework.

According to another embodiment of the present disclosure, a device equipped with the Linux based Android container platform is provided. The device includes a processor and a memory, a Linux host, an Android container which runs on the Linux host, and an integrated security module including a Linux security module having a Linux policy of a process running on the Linux host, and an Android security module having an Android policy of a process running on the Android container. The integrated security module is mounted in a directory shared between the Linux host and the Android container and the integrated security module overwrites a pre-existing Linux security module.

According to another embodiment of the present disclosure, a method for applying a security system in a Linux based Android container environment in which an Android container runs on a Linux host is provided. The method includes generating an integrated security module including a Linux security module having a Linux policy of a process running on the Linux host and an Android security module having an Android policy of a process running on the Android container, mounting the integrated security module in a directory shared between the Linux host and the Android container, and overwriting a pre-existing Linux security module with the integrated security module.

The step of overwriting allows the integrated security module to overwrite the directory in which the Linux security module is mounted on the Linux host, when the Android container runs on the Linux host.

The step of overwriting allows the integrated security module to overwrite the directory in which the Linux security module is mounted on the Linux host, when the Android container runs on the Linux host by mounting process (proc) and system (sys) directory of the Linux host in a Root File System of the Android container.

The step of generating comprises generating the integrated security module which assigns context to a file, user and process, wherein the integrated security module includes a policy that specifies rules between the contexts.

The step of generating comprises generating the integrated security module which performs system access control of the Linux host.

The step of generating comprises generating the integrated security module which performs access control of an app installed on Android.

According to an aspect of the present disclosure, it can solve a conflict problem between the two security modules in the application of container technology.

According to another aspect of the present disclosure, it can provide a safer execution environment than a Linux environment by not using the existing Linux Security Modules (LSM).

According to another aspect of the present disclosure, it can add an additional policy based on the function of Security-Enhanced Linux (SELinux), thereby limiting access privileges of particular processes or apps.

DETAILED DESCRIPTION OF EMBODIMENTS

Figure 1:
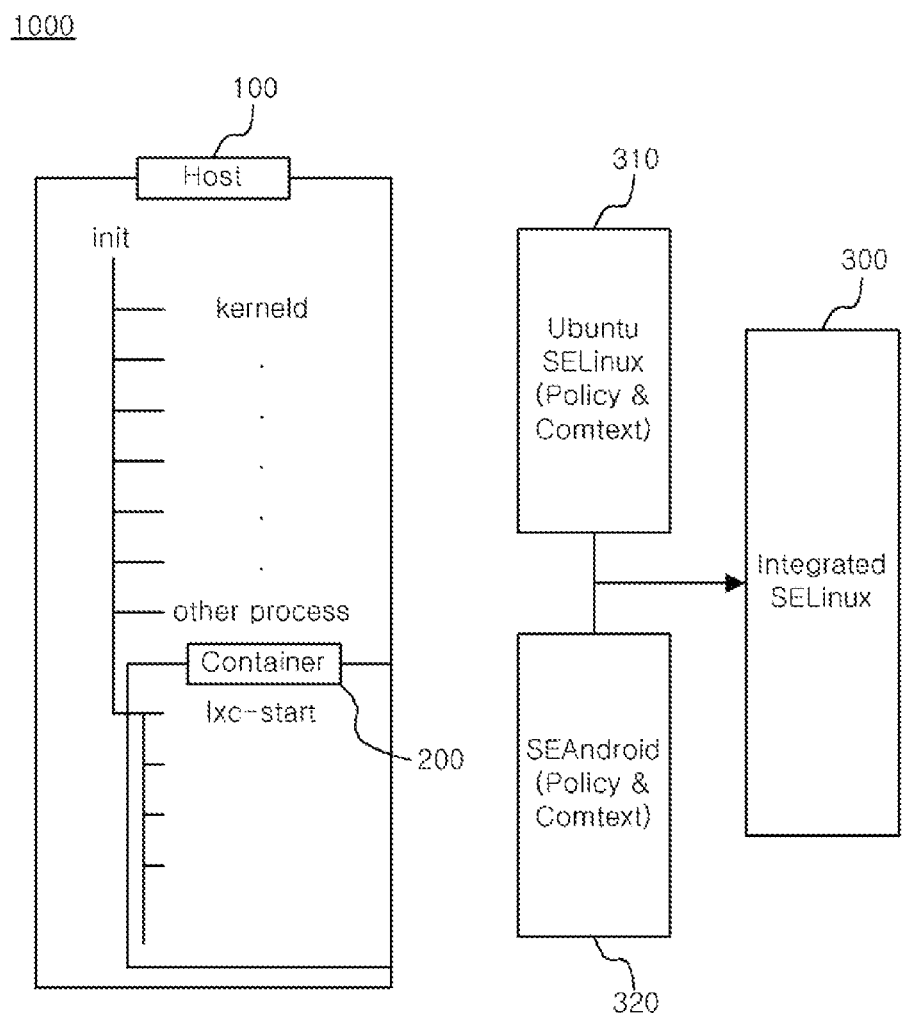
FIG. 1 is a conceptual diagram of a Linux based Android container platform according to an embodiment of the present disclosure.

These and other advantages and features of the present disclosure and methods for achieving them will be apparent from the following detailed description in conjunction with the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims Like reference numerals indicate like elements throughout the specification.

The terminology used herein is for the purpose of describing the embodiments only and is not intended to be limiting of the present disclosure. As used herein, the singular forms are intended to include the plural forms as well, unless the context clearly indicates otherwise. The term "comprises" and/or "comprising" when used in this specification specify the presence of stated elements, steps and operations, but do not preclude the presence or addition of one or more other elements, steps and operations.

The term 'unit' or 'module' is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function FIG. 1 is a conceptual diagram of a Linux based Android container platform according to an embodiment of the present disclosure.

The Linux based Android container platform 1000 according to an embodiment of the present disclosure is a platform in which a security system is applied to prevent a conflict between a security policy of Linux process and a security policy of Android process, keeping Linux and Android processes normally operate.

The Linux based Android container platform 1000 according to an embodiment of the present disclosure may be mounted on a device that can execute various application programs based on the operating system.

Referring to FIG. 1, the Linux based Android container platform 1000 according to an embodiment of the present disclosure may include a Linux host 100, an Android container 200, and an integrated security module 300.

The Linux host 100 is a type of an operating system. The operating system is a system program that allows an application program to use device hardware.

Container technology may be applied to the Linux host 100. The container technology is technology to provide an isolated virtual space of operating system level using namespace and control groups (cgroups). When container technology is applied to the Linux host 100, container shares the kernel and device of the Linux host 100 because it does not support device or kernel virtualization.

The Android container 200 may run on the Linux host 100 using container technology. Android is a mobile operating system developed based on Linux. Accordingly, part of kernel of the Linux host 100 has an option for Android, and thus the Android container 200 can run on the Linux host 100 by the application of container technology.

Specifically, when it runs on the Linux host 100, the Android container 200 may mount the process directory/proc and the system directory/sys of the Linux host 100 in its Root File System. Thus, the Android container 200 shares the process directory/proc and the system directory/sys with the Linux host 100. Here, the process directory/proc may have various process information. The system directory/sys may include system and device information.

The integrated security module 300 may include a Linux security module 310 and an Android security module 320.

The Linux security module 310 may include a policy of a process running on the Linux host 100. The Linux security module 310 typically includes Security-Enhanced Linux (SELinux). In the present disclosure, the Linux security module 310 may be SELinux. The Linux security module 310 may assign context to a file, user and process, and may include a policy that specify rules between each context. The context may contain a user, role and type. The Linux security module 310 may perform system access control according to the policy of the process of the Linux host 100. That is, the Linux security module 310 may control the access of a particular subject to a particular object according to the policy.

The Android security module 320 may include a policy of a process running on the Android container 200. The Android security module 320 typically includes Security-Enhanced Android (SEAndroid). SEAndroid is a lightweight module to apply to an Android framework based on SELinux. In Android version 4.4 (Kitkat), SEAndroid was tested in permissive mode first, and is being really applied in enforcing mode in Android version 5.0 (Lollipop) and up. In the present disclosure, the Android security module 320 may be SEAndroid. The Android security module 320 may include a policy that specify rules between contexts, similar to the Linux security module 310. The Android security module 320 may perform access control of apps (for example, system apps, user apps, etc.) installed on Android according to the policy.

The integrated security module 300 is an integrated security module of the Linux security module 310 and the Android security module 320, and may include both the policy of the process running on the Linux host 100 and the policy of the process running on the Android container 200.

When the Android container 200 runs on the Linux host 100, the integrated security module 300 may be mounted in the directory shared between the Linux host 100 and the Android container 200 to build a security system of the Linux based Android container platform 1000. In relation to this, a description is made with reference to FIG. 2.

Figure 2:
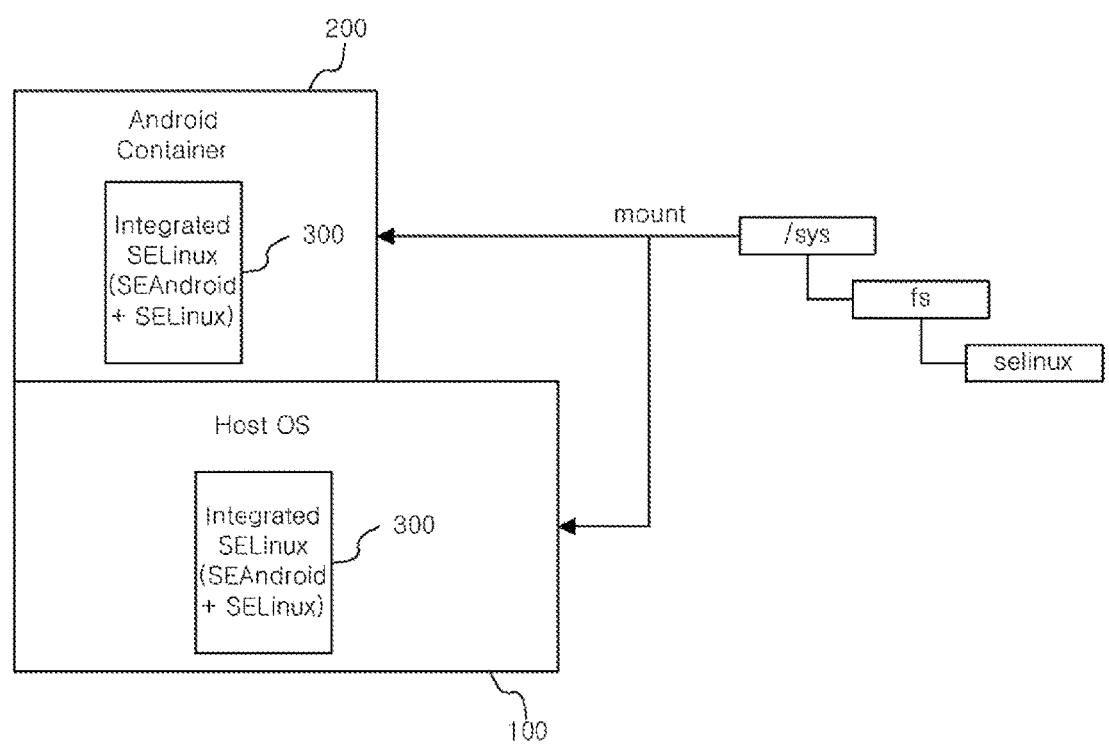
FIG. 2 is a detailed conceptual diagram of a security system applied in a Linux based Android container platform according to an embodiment of the present disclosure.

FIG. 2 is a detailed conceptual diagram of the security system applied in the Linux based Android container platform according to an embodiment of the present disclosure.

Referring to FIG. 2, when the Android container 200 runs on the Linux host 100, the integrated security module 300 may be mounted in the system directory/sys, specifically, /sys/fs/selinux, shared between the Linux host 100 and the Android container 200.

The Linux host 100 can perform access control according to the context and policy of the process running on the Linux host 100, by the Linux security module 310 included in the integrated security module 300.

The Android container 200 can also perform access control according to the context and policy of the process running on the Android container 200, by the Android security module 320 included in the integrated security module 300.

Generally, the related file system of the Linux security module 310 may be mounted in the/sys/fs/selinux directory of the Linux host 100. In this instance, when the Android container 200 runs on the Linux host 100, the Linux host 100 shares the process directory/proc and the system directory/sys with the Android container 200. That is, the Android container 200 can access the/sys/fs/selinux directory.

The Android security module 320, a security module of the Android container 200, is a security module based on the Linux security module 310, and may be mounted on the same directory point as the Linux security module 310. Accordingly, when the Android container 200 runs on the Linux host 100, an Android initialization process, init, mounts the Android security module 320 in the/sys/fs/selinux directory, and the Android security module 320 may overwrite the existing Linux security module 310. In this case, only the context and policy of the process running on the Android container 200 are present in the/sys/fs/selinux directory, and the context and policy of the process running on the Linux host 100 are erased, making normal operation of the Linux host 100 impossible.

In contrast, as shown in FIG. 2, when the Android container 200 runs on the Linux host 100, both the Linux host 100 and the Android container 200 can normally operate according to the suitable context and policy, because the integrated security module 300 mounted in the /sys/fs/selinux directory includes the Linux security module 310 and the Android security module 320.

As described above, the Linux based Android container platform 1000 according to an embodiment of the present disclosure, in which a security system is applied using the integrated security module 300 including both the policy of the process running on the Linux host 100 and the policy of the process running on the Android container 200, can solve the conflict problem between the two security modules in the application of container technology.

Moreover, the Linux based Android container platform 1000 according to an embodiment of the present disclosure can provide a safer execution environment than a Linux environment not using the conventional LSM (Linux Security Modules), by applying a security system based on SELinux. Furthermore, an additional policy can be added based on the function of SELinux, thereby limiting access privileges of particular processes or apps.

Hereinafter, a method for applying a security system in the Linux based Android container platform 1000 according to an embodiment of the present disclosure as shown in FIG. 1 is described with reference to FIG. 3.

Figure 3:
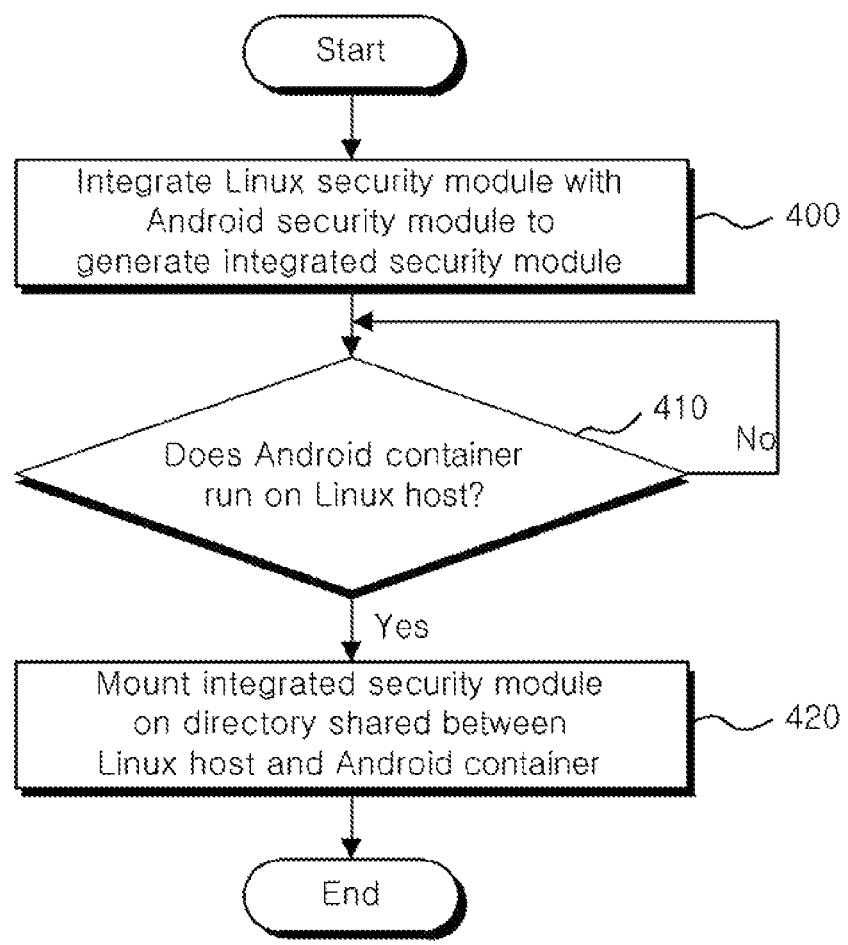
FIG. 3 is a flowchart of a method for applying a security system in a Linux based Android container environment according to an embodiment of the present disclosure.

FIG. 3 is a flowchart of a method for applying a security system in a Linux based Android container environment according to an embodiment of the present disclosure.

Referring to FIG. 3, the integrated security module 300 in which the Linux security module 310 is integrated with the Android security module 320 may be generated (400). The Linux security module 310 may include the context and policy of the process running on the Linux host 100. The Android security module 320 may include the context and policy of the process running on the Android container 200.

When the Android container 200 runs on the Linux host 100 (410), the integrated security module 300 may be mounted in a directory shared between the Linux host 100 and the Android container 200 (420). When the Android container 200 runs on the Linux host 100, an Android initialization process, init, may mount the integrated security module 300 in /sys/fs/selinux directory.

The method for applying a security system in a Linux based Android container environment described above may be implemented in the form of program commands that are executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be known and available to those having ordinary skill in the field of computer software.

Examples of the computer-readable recording media include hardware devices specially designed to store and execute program commands, such as magnetic media like as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the operation according to the present disclosure, or vice versa.

While the embodiments of the present disclosure have been hereinabove described with reference to the accompanying drawings, it will be appreciated by those having ordinary skill in the technical field pertaining to the present disclosure that the present disclosure may be embodied in other specific forms without changing the technical spirit or essential features of the present disclosure. Therefore, it should be understood that the embodiments described above are for illustration purposes only in all aspects, but not intended to be limiting.

DETAILED DESCRIPTION OF MAIN ELEMENTS

1000: Linux based Android container platform
100: Linux host
200: Android container
300: Integrated security module
310: Linux security module
320: Android security module

What is claimed is:

1. A system for running a Linux based Android container platform with a processor and a memory, the system comprising:
a Linux host;
an Android container which runs on the Linux host; and
an integrated security module including,
a Linux security module having a Linux policy of a process running on the Linux host, and
an Android security module having an Android policy of a process running on the Android container,
wherein the integrated security module is mounted in a directory shared between the Linux host and the Android container and the integrated security module overwrites a pre-existing Linux security module.

2. The system of claim 1, wherein the Android container shares kernel and device with the Linux host.

3. The system of claim 1, wherein the Android container mounts process (proc) and system (sys) directory of the Linux host in a Root File System of the Android container.

4. The system of claim 1, wherein the integrated security module overwrites the pre-existing Linux security module, when the Android container runs on the Linux host.

5. The system of claim 1, wherein the integrated security module assigns context to a file, user, and process.

6. The system of claim 5, wherein the integrated security module includes a policy that specifies rules between the contexts.

7. The system of claim 6, wherein the integrated security module performs system access control according to the policy that specifies rules between the contexts.

8. The system of claim 1, wherein the integrated security module includes the Linux security module and a light-weight Android security module which allows the Linux security module to be applied to an Android framework.

9. A device equipped with the Linux based Android container platform, the device comprising:
a processor and a memory;
a Linux host;
an Android container which runs on the Linux host; and
an integrated security module including,
a Linux security module including a Linux policy of a process running on the Linux host, and
an Android security module including an Android policy of a process running on the Android container,
wherein the integrated security module is mounted in a directory shared between the Linux host and the Android container and the integrated security module overwrites a pre-existing Linux security module.

10. A method for applying a security system in a Linux based Android container environment in which an Android container runs on a Linux host, the method comprising:
generating an integrated security module including a Linux security module having a Linux policy of a process running on the Linux host and an Android security module having an Android policy of a process running on the Android container;
mounting the integrated security module in a directory shared between the Linux host and the Android container; and
overwriting a pre-existing Linux security module with the integrated security module.

11. The method of claim 10, wherein the step of overwriting allows the integrated security module to overwrite the directory in which the Linux security module is mounted on the Linux host, when the Android container runs on the Linux host.

12. The method of claim 10, wherein the step of overwriting allows the integrated security module to overwrite the directory in which the Linux security module is mounted on the Linux host, when the Android container runs on the Linux host by mounting process (proc) and system (sys) directory of the Linux host in a Root File System of the Android container.

13. The method of claim 10, wherein the step of generating comprises generating the integrated security module which assigns context to a file, user and process, wherein the integrated security module includes a policy that specifies rules between the contexts.

14. The method of claim 10, wherein the step of generating comprises generating the integrated security module which performs system access control of the Linux host.

15. The method of claim 14, wherein the step of generating comprises generating the integrated security module which performs access control of an app installed on Android.

* * * * *